(12) United States Patent
Baldassari

(10) Patent No.: US 8,206,559 B2
(45) Date of Patent: Jun. 26, 2012

(54) APPARATUS FOR ELECTROPHORETIC PAINTING OF METAL OBJECTS, IN PARTICULAR LIDS FOR CONTAINERS FOR FOOD USE

(75) Inventor: Gianfranco Baldassari, Montechiarugolo (IT)

(73) Assignee: Corima International S.r.l., Vigarano Pieve di Vigarano Mainarda (Ferrara) (IT)

( * ) Notice: Subject to any disclaimer, the term of this patent is extended or adjusted under 35 U.S.C. 154(b) by 506 days.

(21) Appl. No.: 12/525,879

(22) PCT Filed: Feb. 6, 2008

(86) PCT No.: PCT/IB2008/000257
§ 371 (c)(1),
(2), (4) Date: Aug. 5, 2009

(87) PCT Pub. No.: WO2008/096235
PCT Pub. Date: Aug. 14, 2008

(65) Prior Publication Data
US 2010/0006440 A1 Jan. 14, 2010

(30) Foreign Application Priority Data
Feb. 6, 2007 (IT) .................. B02007A0068

(51) Int. Cl.
*C25D 17/00* (2006.01)
*C25D 1/12* (2006.01)
(52) U.S. Cl. ....................................... 204/199; 204/623
(58) Field of Classification Search .................. 204/198, 204/199, 623
See application file for complete search history.

(56) References Cited

U.S. PATENT DOCUMENTS
4,005,000 A 1/1977 Kraska
6,264,816 B1 * 7/2001 Borra ............................ 204/623

FOREIGN PATENT DOCUMENTS
EP        0971051 A    1/2000
GB         943038 A   11/1963
WO    W094/25645 A   11/1994
WO   W002/072284 A    9/2002

OTHER PUBLICATIONS
International Search Report.
* cited by examiner

*Primary Examiner* — Luan Van
(74) *Attorney, Agent, or Firm* — William J. Sapone; Coleman Sudol Sapone P.C.

(57) ABSTRACT

The apparatus for electrophoretic repainting of metal objects, in particular lids for containers for food use, comprises a tank (30) containing an electrophoretic bath; an electrode, immersed in the electrophoretic bath, a conveyor line (10), provided with elements for supporting lids (20), the conveyor line (10) being arranged such as to transit internally of the tank (30) in order to immerse the lids (20) in the electrophoretic bath; and a unit (40) for establishing an electrical contact with the lids (20) transiting immersed in the bath, having an opposite polarity with respect to a polarity of the electrode immersed in the bath. The contact unit (40) includes a rotation element (4) which rotates about a longitudinal axis thereof, an external lateral surface (42) thereof affording a groove (5) having a helical progression destined to receive conductive electrical means such as to contact at least an end portion (21) of the lids (20). The arrangement of the rotation element (4) above the tank (30) and with respect to the conveyor line (10), is such that at least a point of the conductive electrical means maintains contact with the end portion (21) of the lids (20) during transit thereof immersed in the solution of the tank (30).

25 Claims, 4 Drawing Sheets

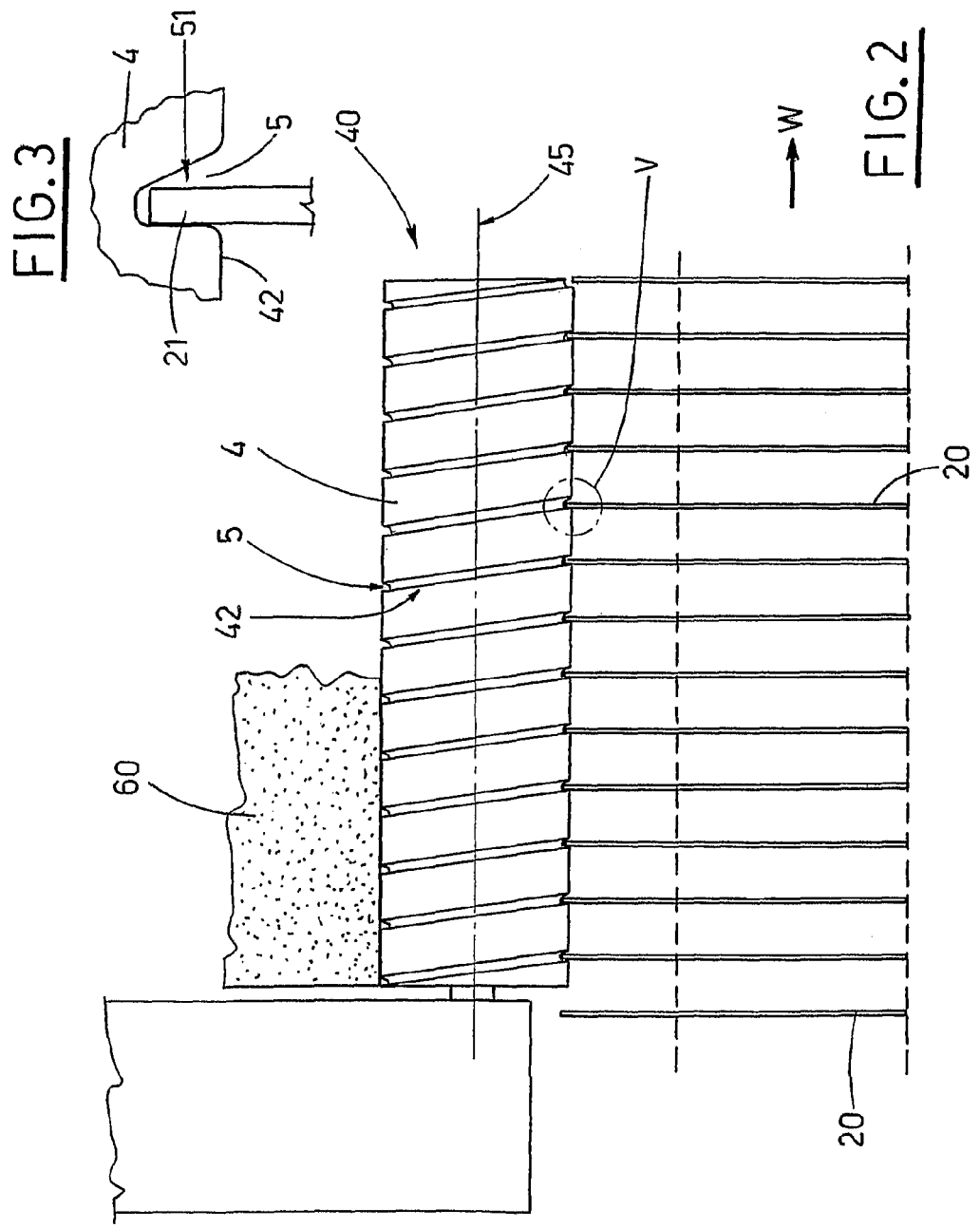

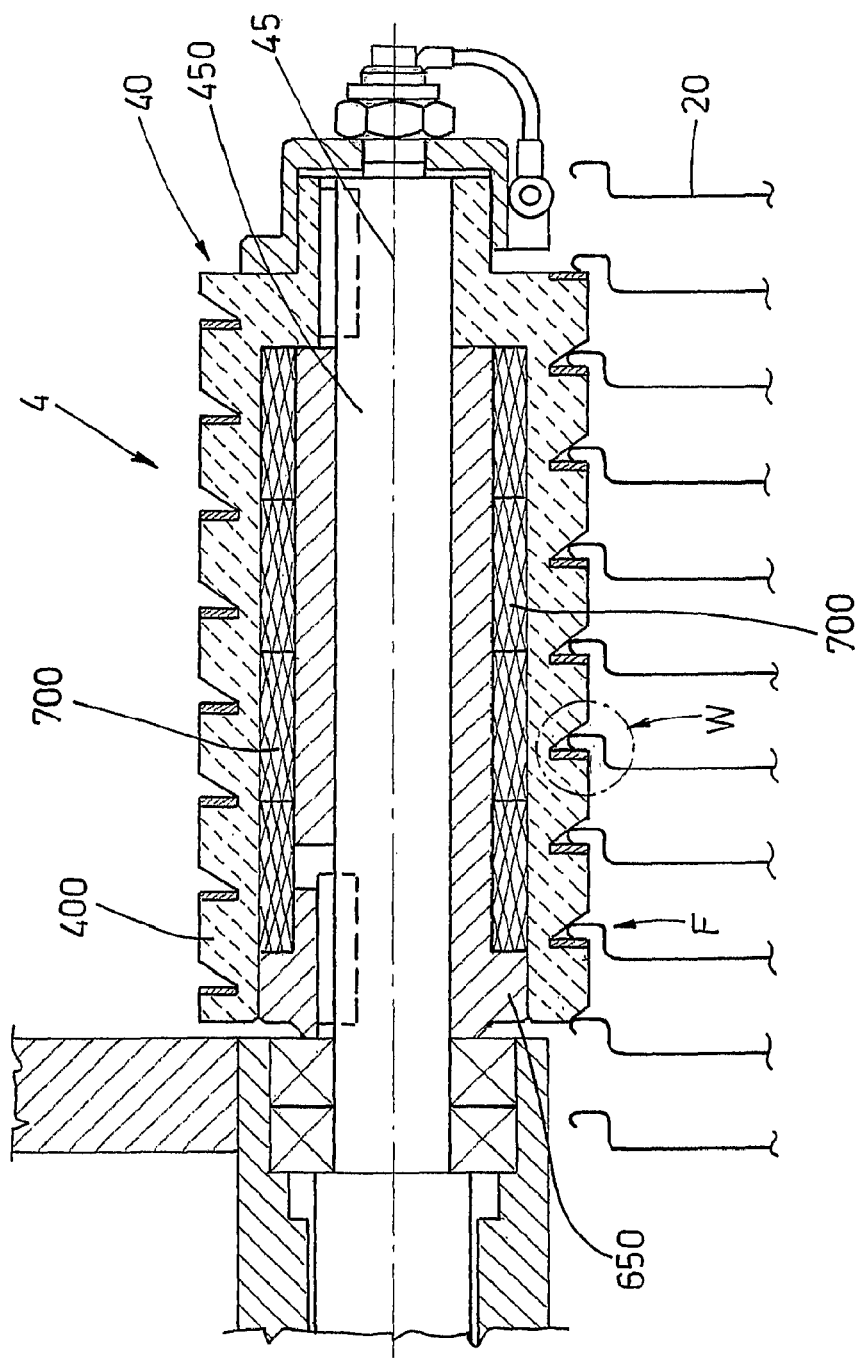

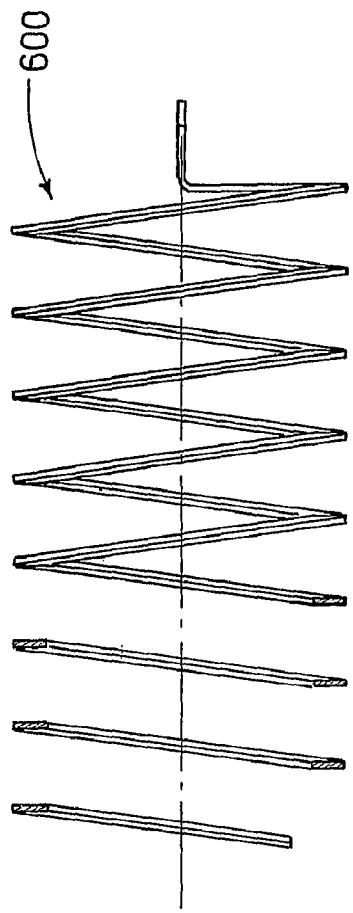
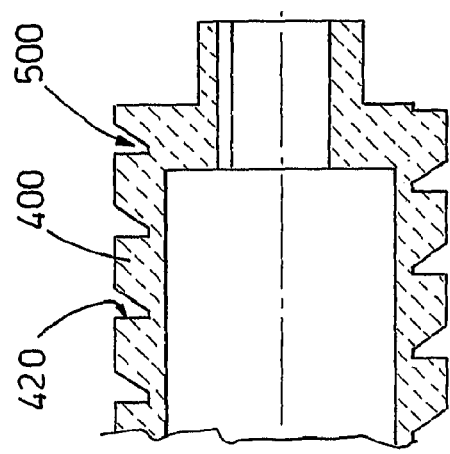
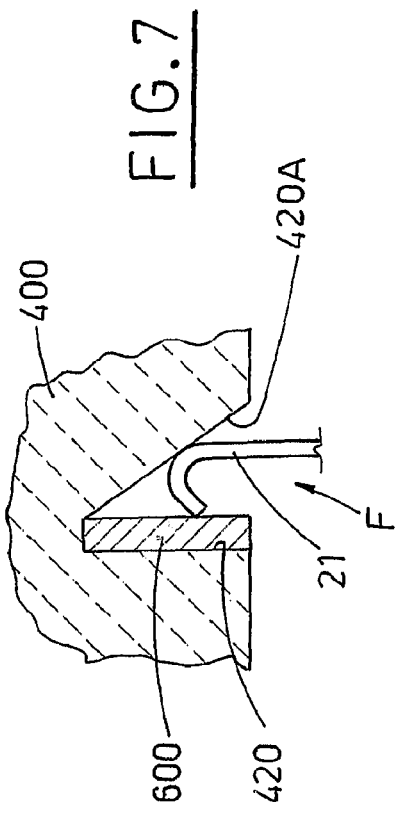

APPARATUS FOR ELECTROPHORETIC PAINTING OF METAL OBJECTS, IN PARTICULAR LIDS FOR CONTAINERS FOR FOOD USE

TECHNICAL FIELD

The invention relates to the technical sector concerning painting metal objects, in particular lids for food-use containers, realized by immersing the lids in an electrophoretic bath.

BACKGROUND ART

Lids for closing containers used for storing food products usually include a pre-fractured line which facilitates opening of the container.

The pre-fracture line is made on lids which have already been painted, so the pre-fracturing operation might cause cracks and/or breaks in the covering paint.

The lids therefore require a further stage of painting in order to cover the exposed points.

Document EP 0.971.051 describes an apparatus for performing repainting on lids, by immersing them in an electrophoretic bath.

The apparatus described in this document comprises a tank containing an electrophoretic bath, an electrode, for example a negative-polarity electrode (cathode), immersed in the bath, a conveyor line bearing support elements for the lids to convey them in immersion internally of the bath in the tank, and a contact unit, for example having positive polarity (anode), to establish an electrical contact with the lids during transit thereof immersed in the bath, which contact unit is positioned above the tank.

The contact of the lids immersed in the bath with the anode contact unit determines passage of the current from the negative electrode (cathode), via the electrophoretic bath, to the lids themselves: in consequence of this passage of current, the solid particles present in the bath adhere to the lid, mainly in the exposed points, and coat them.

The contact unit for realizing an electrical contact with the lids, for example with a negative polarity (anodic unit), used in the apparatus described in EP 0.971.051, is very complex.

It comprises a chain element arranged ring-wound with an operative tract that extends parallel above the tract of the conveyor line along which the lids are immersed in the bath.

The chain element is provided with support blocks, made of a non-conductive material, to which small tongues are fastened, made of a conductive material, such as to be positioned transversally to the chain element.

The tongues are destined to make contact with the lids transiting immersed internally of the bath of the tank.

In this respect, each tongue comprises a first end for contacting the lids, and a second end for contacting an electrically positively-polarized bar, positioned parallel to the operative tract of the chain element.

The chain element must be activated such that the tongues, which run along the operative tract which extends above the conveyor line, first contact (with their first end) the transiting lids immersed in the bath, and consequently contact, with their second ends, the positively-polarized bar, in order to obtain anodic contact with the lids, when they are still immersed in the bath.

The above-described anodic unit exhibits a complex structure, and the cleaning operations of the single tongues are not particularly easy and also require the apparatus to be stopped.

Further, maintenance in the case of breakage of one or more tongues requires a considerable inoperative time.

The aim of the present invention is therefore to provide an apparatus for electrophoretic repainting of metal objects, in particular lids for containers for food use, which can realize an electrical contact with the lids immersed in the electrophoretic bath in a way which is both simple and immediate.

A further aim of the invention is to provide an apparatus for electrophoretic repainting of lids for containers of food products, which enables the contact units, which contact the lids, to be cleaned without having to stop the apparatus from operating.

A further aim of the invention is to provide an apparatus for electrophoretic repainting of lids which is provided with a unit for electrical contact with the immersed lids, which has a simple and functional structure in realization of the contact with the lids immersed in the electrophoretic bath.

DISCLOSURE OF INVENTION

The above-described aims are entirely attained with an apparatus for electrophoretic repainting of metal objects, in particular for lids of containers for food use, comprising a bath containing an electrophoretic bath; an electrode immersed in the electrophoretic bath; a conveyor line provided with elements for supporting lids, the line being arranged such as to transit internally of the tank in order to immerse the lids in the electrophoretic bath; a unit for establishing electrical contact with the lids transiting immersed in the bath, having an opposite polarity with respect to a polarity of the electrode immersed in the bath, characterized in that the contact unit comprises a rotation element, made rotatable with respect to a longitudinal axis thereof, an external surface of which affords a helical groove having an internal profile such as to be able to receive at least an end portion of the lids, a rotating arrangement of the rotatable element above the bath, and with respect to the conveyor line, being such that at least a point of the internal profile of the groove maintains contact with the end portion of the lids during the immersed transit thereof in the solution of the bath.

BRIEF DESCRIPTION OF THE DRAWINGS

Further characteristics and advantages of the present invention will better emerge from the following description of a preferred embodiment of the invention, made with reference to the accompanying figures of the drawings, in which:

FIG. 2 is an enlarged scale illustration with respect to FIG. 1, of a particularly significant element of the present invention;

FIG. 3 is an enlarged view of the detail denoted by the letter V in FIG. 2;

FIG. 4 is an axial section of a variant of what is illustrated in FIG. 2;

FIG. 5 illustrates, with some parts removed and some in view, a metal helix used in the variant of FIG. 4;

FIG. 6 is an axial section of a portion of the tubular nucleus used in the variant of FIG. 4;

FIG. 7 illustrates, in enlarged scale, the detail W of FIG. 4.

BEST MODE FOR CARRYING OUT THE INVENTION

Figure 1:
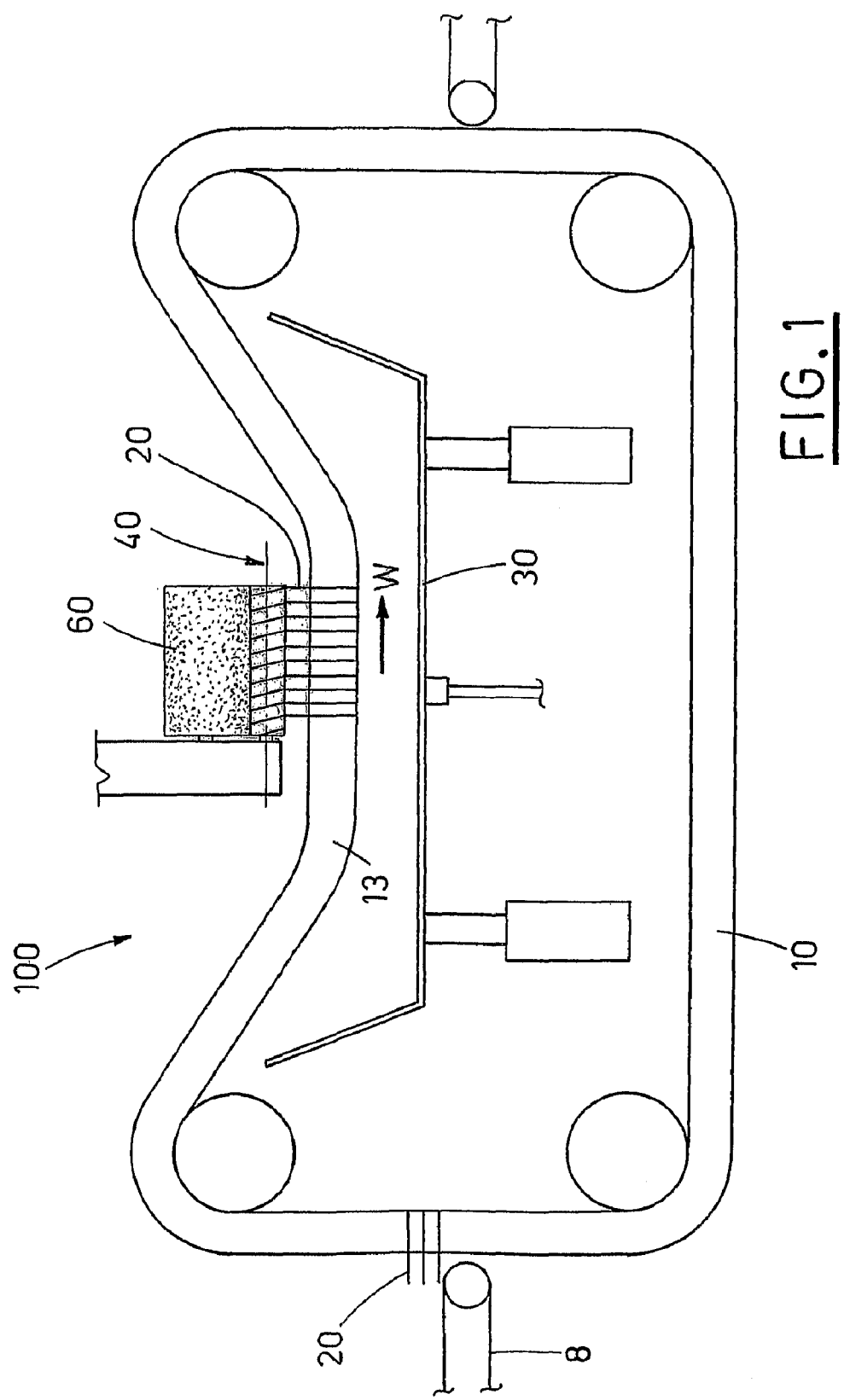
FIG. 1 is a schematic illustration of a partially-sectioned lateral view of an apparatus for electrophoretic repainting of metal objects, in particular lids for containers for food use, object of the present invention.

With reference to the figures of the drawings, in particular FIG. 1, 100 denotes in its entirety an apparatus for electrophoretic repainting of metal objects, in particular lids for containers of food products.

The apparatus 100 is provided with a conveyor line 10 exhibiting support elements for receiving and retaining the lids 20 to be subjected to repainting.

The lids 20 to be repainted are directed towards the conveyor line by means of a conveyor 8.

The conveyor line 10, as illustrated in FIG. 1, develops according to a closed ring-wound trajectory about relative guide and activation wheels and, in particular, includes an upper straight tract 13 arranged such as to convey the lids 20 under immersion internally of an electrophoretic bath contained in a tank 30.

An electrode (not illustrated) is positioned internally of the tank 30, which electrode can have negative polarity (cathode) or positive polarity (anode) according to the type of electrophoretic bath used.

A unit 40 for establishing electric contact with the lids 20 during the transit thereof in immersion in the electrophoretic bath of the tank 30 is positionable above the tank 30 and the upper straight tract 13 of the conveyor line 10.

The unit 40 exhibits an opposite polarity to the polarity of the electrode immersed in the bath.

For example, in the case of an anaphoretic bath, the electrode immersed in the bath will have a negative polarity (cathode) and the contact unit 40 will have a positive polarity (anode), while in the case of a cataphoretic bath the electrode in the bath will have a positive polarity (anode) while the unit 40 will have a negative polarity (cathode).

In the following description reference will be made, purely by way of non-limiting example, to an anaphoretic bath, i.e. with a contact unit 40 having positive polarity (anode).

The contact unit 40 is connected to the positive pole of a constant voltage generator (not illustrated) while the above-mentioned negative-polarity electrode (cathode), immersed in the tank, is connected to the negative pole of the generator.

The positive polarity contact unit 40, as illustrated in detail in FIG. 2, is constituted by a rotation element 4, rotatable with respect to the longitudinal axis 45 thereof.

In the embodiment of FIGS. 2-3, the rotation element 4 is constituted by a cylindrical nucleus of conductor material.

The peculiarity of the present invention consists in the fact that the external lateral surface 42 of the rotatable element 4 affords a helical groove 5, which groove 5 exhibits an internal profile 51 of such a dimension as to receive at least an end portion 21 of the lids 20 (see, for example, FIG. 3).

Further, as is well illustrated in FIGS. 2 and 3, the rotation element 4 is positionable above the tank 30 of the upper straight tract 13 of the conveyor line 10 such that at least a point of the internal profile 51 of the groove 5 maintains contact with the end portion 21 of the lids 20 during transit thereof in immersion in the bath of the tank 30.

In practice, when a lid 20 is conveyed immersed in the bath of the tank and consequently below the rotation element 4, the helical groove 5 of the rotation element 4 captures the relative portion of upper end 21 and, thanks to the continuous rotation of the rotation element 4 and the helix developing along the external lateral surface 42 thereof, accompanies the end portion 21 of the lid 20 during the advancement thereof along the straight tract 13 of the conveyor line 10.

In this regard, the speed of rotation of the rotation element 4 has to be specially synchronized with the advancement speed of the lids 20, immersed in the bath of the tank 30, along the upper straight tract 13 of the conveyor line 10.

The rotation element 4 can be realized in any conductive material suitable to be positively polarized and to realize an anodic-type contact with the lids.

As illustrated in the special embodiment of FIG. 2, the rotation element 4 is constituted by a cylinder arranged with the longitudinal axis 45 thereof parallel to the advancement direction W of the conveyor line 10 when transiting in immersion in the tank, and the groove 51 is none other than a helical threading realized in the external lateral surface 42 of the cylinder 4.

The rotation element 4, in other embodiments which are not illustrated, can be constituted by an endless screw, with a relative helical thread, or by a conical or truncoconical element, also provided with a helical thread on the external lateral surface thereof.

In the latter case, the conical or truncoconical element will be arranged above the tank, and with respect to the upper straight line of the conveyor line, such that a relative directrix of the lateral surface is parallel to the advancement direction of the conveyor line 10 when transiting immersed in the tank.

The step of the helical thread on the external lateral surface of the rotation element 4 is suitably equal to a distance between the support elements of the lids 20 of the conveyor line 10.

As illustrated in FIG. 3, the contact between the internal profile 51 of the groove 5 (thread) and the end portion 21 of the lids can occur at a lateral wall of the profile 51.

Alternatively, in other embodiments which are not illustrated, the contact can also be realized between a bottom wall and the end portion 21 of the lids 22 or, contemporaneously, between a lateral wall and a bottom wall of the profile 51, and the end portion 21 of the lids 20.

This will depend on the relative positioning selected and set between the rotation element 4 and the upper straight tract 13 of the conveyor line 10 immersed in the bath in the tank.

A further detail, and an advantageous characteristic of the present invention, is constituted by the fact that the lids are freely retained by the relative support elements of the conveyor line 10, the support elements being such as to retain the lids, enabling the lids to advance along the conveyor line but without any constriction.

Consequently it is possible to realize a dragging contact between the internal profile 51 of the groove 5 (thread) of the rotation element 4 and the end portion 21 of the lids such that the lids 20 are rotatable with respect to the support elements.

In this way, the transiting lids immersed in the bath in the tank, during their contact with the groove 5 of the rotation element 4, i.e. with the negative polarizing unit, are rotated in the electrophoretic bath, enabling the particles in the bath to adhere to each point on the surface of the lids themselves, even those points which, if there were no rotation, would be situated at the support elements.

The provided apparatus further advantageously exhibits a rotating brush element 60, or roller, which is specially arranged above the rotation element 4, with the external surface of the brush or roller in a position of slight interference with the external lateral surface 42 thereof.

The function of the brush or rotating roller 60 is that of maintaining both the external lateral surface 42 and the groove 5 (thread) of the rotation element 4 constantly clean.

The cleaning operations of the positive polarity unit (anode) can thus be performed without any interruption in the functioning of the apparatus.

The rotation element 4 (anodic unit) is connected, via a non-conductive joint, to a relative rotation operation motor (not illustrated in the figures of the drawings).

From the above, the advantages of the present invention clearly emerge:

the particularly simple structure of the unit for electrical contact with the lids (which unit can have a positive polarity, anode, or negative, cathode), constituted simply by a rotation element;

the realization of an electrical contact (anodic or cathodic) which is direct and functional with the lids, thanks to the helical groove (thread) present in the external lateral surface of the rotation element 4 which contactingly accompanies the lids during the advancement thereof along the conveyor line, immersed in the electrophoretic bath;

the possibility of effecting a cleaning of the contact unit (rotation element) without having to interrupt functioning of the apparatus;

the performing of a complete repainting operation on each point of the lids, inasmuch as these are rotatable with respect to the relative support elements internally of the electrophoretic bath thanks to the continuous dragging contact between the internal profile of the groove and an end portion of the lids.

In the embodiment of FIGS. 4-7, the rotation element 4 is constituted by a tubular nucleus 400 of an insulating material keyed, in a known way, on a shaft 450. The nucleus and the external surface exhibit a helical groove 500; the internal surface 420 of the groove progresses helically.

A metal helix 600 having a constant rectangular section is inserted in the groove 500, the helix 600 being of a size and having an elastic constant such as to adhere and elastically press on the internal surface 420 of the groove 500 (see FIGS. 4 and 7); an expert in the field will use a good electrical conductor for the helix.

A sleeve 650 is comprised internally of the tubular nucleus 400, which sleeve 650 is keyed on the shaft 450 in a known way.

A free space is defined between the external surface of the sleeve and the internal surface of the tubular nucleus, in which free space annular magnets 700, coaxial with the shaft 450, are inserted.

The expert in the sector will be aware of means for supplying tension to the metal helix 600.

In the embodiment illustrated in FIGS. 4-7, the only part of the rotation element 4 under tension is the metal helix 600; electric arcs cannot be generated between the inclined part 420A of the groove 500 and the end portion 21 of the lid 20 (see FIG. 7), as the tubular nucleus 400 is made of an insulating material.

The action of the magnetic field produced by the magnets 700 determines a radial force F on the lids 20 (which are metallic), which radial force F leads the end portions 21 of the lids 20 to contact the relative inclined parts 420A of the grooves 500 (FIG. 7); this leads to positioning the lids at the same level.

The maintenance of the rotation element 4 includes replacing the metal helix 400 when worn with a new one. This is rapid and simple to do.

The invention has been described with reference to the case of anaphoretic-type repainting, i.e. with the contact unit positively polarized; it could, however, as previously mentioned, be applied also to the case of cataphoretic-type repainting, i.e. with the contact unit negatively polarized.

The invention claimed is:

1. An apparatus for electrophoretic repainting of lids for containers for food use, comprising:
    a tank (30) containing an electrophoretic bath;
    an electrode, immersed in the electrophoretic bath;
    a conveyor line (10), provided with supporting elements for lids (20), the conveyor line (10) being arranged to transit internally of the tank (30) in order to immerse the lids (20) in the electrophoretic bath;
    a unit (40) for establishing an electrical contact with the lids (20) transiting immersed in the bath, having an opposite polarity with respect to a polarity of the electrode immersed in the bath,
    characterized in that the contact unit (40) includes a rotation element (4), rotatable about a longitudinal axis parallel to an advancement direction (W) of the conveyor line (10), an external lateral surface of the rotation element (4) affording a groove (5), (500) having a helical progression, destined to receive electrical conductor means to contact at least an end portion (21) of the lids (20), arrangement of the rotation element (4) above the tank (30) and with respect to the conveyor line (10) being such that at least a point of the electrical conductor means maintains contact with the end portion (21) of the lids (20) during transit thereof in immersion in the bath of the tank(30).

2. The apparatus of claim 1, characterized in that the conductor means comprise the rotation element (4) constituted by a cylindrical nucleus of conductive material, and in that an internal profile (51) of the groove (5) develops helically and is such that at least a point of the internal profile (51) maintains contact with the end portion (21) of the lids (20).

3. The apparatus of claim 1, characterized in that the conductor means are a helix (600) made of a conductive material inserted in the groove (500) of the rotation element (4), the rotation element (4) being constituted by a tubular nucleus (400) made of an insulating material, with the helix (600) exhibiting a surface developing helically such that at least a point of the helix (600) maintains contact with the end portion (21) of the lids (20).

4. The apparatus of claim 2, characterized in that the nucleus (400) is arranged, with respect to the tank (30) and the conveyor line (10) such that a relative longitudinal axis (45) thereof is parallel to the advancement direction (W) of the conveyor line (10) when transiting immersed in the bath of the tank (30).

5. The apparatus of claim 2, characterized in that the groove (5) is constituted by a helical thread realized on the external lateral surface of the rotation element (4).

6. The apparatus of claim 2, characterized in that the rotation element (4) is constituted by an endless screw, the endless screw being arranged, with respect to the tank (30) and the conveyor line (10), such that a longitudinal axis thereof is parallel to the advancement direction (VV) of the conveyor line (10) when transiting immersed in the bath of the tank (30).

7. The apparatus of claim 6, characterized in that the groove (5) is constituted by a helical thread realized on an external surface of the endless screw.

8. The apparatus of claim 2, characterized in that the rotation element (4) is constituted by a conical or truncoconical element, the conical element being arranged, with respect to the tank (30) and the conveyor line (10), such that an external lateral surface of the conical element is parallel to the advancement direction (W) of the conveyor line (10) when the conveyor line (10) is transiting immersed in the bath in the tank (30).

9. The apparatus of claim 8, characterized in that the groove (5) is constituted by a helical thread realized on the external lateral surface of the conical element.

10. The apparatus of claim 2, wherein contact between at least a point of the internal profile (51) of the groove (5) and the end portion (21) of the lids (20) occurs at a lateral wall of the groove (51).

11. The apparatus of claim 2, characterized in that the contact between at least a point of the internal profile (51) of the groove (5) and the end portion (21) of the lids (20) occurs at a bottom wall of the groove.

12. The apparatus of claim 5, characterized in that a step of the helical thread corresponds to a distance between the support elements of the conveyor line (10).

13. The apparatus of claim 3, wherein the tubular cylindrical nucleus (400) is keyed on a shaft (450), characterized in that it comprises, between the shaft (450) and the nucleus (400), magnets (700) which are destined to generate, on the end portions (21) of the metal lids (20), a radial force (F) directed towards the longitudinal axis (45) of the shaft (450) with a consequent positioning of the lids at a same level thereas.

14. The apparatus of claim 1, in which the lids (20) are freely retained by the support elements of the conveyor line (10), characterized in that the contact between at least a point of an interior profile (51) of the electrical conductor means and the end portion (21) allows the lids (20) to be rotated with respect to the support elements, in consequence of the rotation of the rotation element (4).

15. The apparatus of claim 1 or 2 or 3, characterized in that it comprises a brush element or rotating roller (60), positionable above the rotation element (4), for cleaning the external surface (42) and the helical groove (5) (500) therein.

16. The apparatus of claim 1, wherein the contact unit (40) has positive polarity and the electrode immersed in the bath of the tank (30) has negative polarity.

17. The apparatus of claim 1, wherein the contact unit (40) has negative polarity and the electrode immersed in the bath of the tank (30) has positive polarity.

18. The apparatus of claim 3, characterized in that a step of the helix (600) corresponds to the distance between the metal discs (20).

19. The apparatus of claim 3, characterized in that the tubular nucleus (400) is arranged, with respect to the tank (30) and the conveyor line (10) such that a relative longitudinal axis (45) thereof is parallel to the advancement direction (W) of the conveyor line (10) when transiting immersed in the bath of the tank (30).

20. The apparatus of claim 7, characterized in that a step of the thread corresponds to a distance between the support elements of the conveyor line (10).

21. The apparatus of claim 9, characterized in that a step of the helical thread corresponds to a distance between the support elements of the conveyor line (10).

22. The apparatus of claim 2, in which the lids (20) are freely retained by the support elements of the conveyor line (10), characterized in that the contact between at least a point of the internal profile (51) of the electrical conductor means and the end portion (21) allows the lids (20) to be rotated with respect to the support elements, in consequence of the rotation of the rotation element (4).

23. The apparatus of claim 3, in which the lids (20) are freely retained by the support elements of the conveyor line (10), characterized in that the contact between at least a point of an internal profile (51) of the electrical conductor means and the end portion (21) allows the lids (20) to be rotated with respect to the support elements, in consequence of the rotation of the rotation element (4).

24. The apparatus of claim 2, characterized in that it comprises a brush element or rotating roller (60), positionable above the rotation element (4), for cleaning the external surface (42) and the helical groove (5) (500) therein.

25. The apparatus of claim 3, characterized in that it comprises a brush element or rotating roller (60), positionable above the rotation element (4), for cleaning the external surface (42) and the helical groove (5) (500) therein.

* * * * *